United States Patent [19]

Scerbo et al.

[11] 4,320,261
[45] Mar. 16, 1982

[54] CABLE ROUTING METHODS AND APPARATUS

[75] Inventors: Louis J. Scerbo, Succasunna; Jeremia P. Starace, Randolph Township, Morris County, both of N.J.

[73] Assignee: Bell Telephone Laboratories, Incorporated, Murray Hill, N.J.

[21] Appl. No.: 193,448

[22] Filed: Oct. 3, 1980

[51] Int. Cl.³ .............................................. H04Q 1/06
[52] U.S. Cl. ...................................... 179/98; 361/428
[58] Field of Search ..................... 179/98, 91 R, 1 PC; 361/428, 429

[56] References Cited

U.S. PATENT DOCUMENTS

| | | | |
|---|---|---|---|
| 3,563,882 | 2/1971 | Kimura et al. | 179/98 |
| 3,652,806 | 3/1972 | Nakagami et al. | 179/98 |
| 3,855,427 | 12/1974 | Sinden | 179/98 |
| 4,158,754 | 6/1979 | Yonezaki et al. | 179/98 |

FOREIGN PATENT DOCUMENTS 1938952  2/1970  Fed. Rep. of Germany ........ 179/98

*Primary Examiner*—Gerald L. Brigance
*Attorney, Agent, or Firm*—R. O. Nimtz

[57] ABSTRACT

A modularized main distributing frame system (100) for interconnecting outside plant cables (140-143) with central office equipment leads (230,231) includes an overhead racking arrangement to route tie cables (130,131) and the equipment leads to framework line-ups (110,120). The tie cables connect the outside plant cables to widely dispersed appearances of frame terminals. To avoid crosses of tie cables as well as minimizing cable lengths and routes, the tie cables are routed using a methodology which partitions the cables in groupings. Each grouping is allocated a separate in-line spreading rack (160-163) to distribute the tie cables. In multiple line-up systems, another level of overhead racks (150,170,171) distributes the tie cables to the horizontally displaced spreading racks. Equipment leads are routed on a complementary racking structure (190-195) utilizing a methodology similar to the tie cabling technique.

5 Claims, 24 Drawing Figures

FIG. 6

| SINGLE | | | | | | DOUBLE | | | | | | TRIPLE | | | | | |
|---|---|---|---|---|---|---|---|---|---|---|---|---|---|---|---|---|---|
| 10 | 12 | 14 | 16 | 18 | 20 | 10 | 12 | 14 | 16 | 18 | 20 | 10 | 12 | 14 | 16 | 18 | 20 |
| 1 | 1 | 1 | 1 | 1 | 1 | 1 | 1 | 1 | 1 | 1 | 1 | 1 | 1 | 1 | 1 | 1 | 1 |
| 5 | 5 | 5 | 5 | 5 | 5 | 19 | 23 | 27 | 31 | 35 | 39 | 19 | 23 | 27 | 31 | 35 | 39 |
| 9 | 9 | 9 | 9 | 9 | 9 | 5 | 5 | 5 | 5 | 5 | 5 | 21 | 25 | 29 | 33 | 37 | 41 |
| 3 | 3 | 13 | 13 | 13 | 13 | 15 | 19 | 23 | 27 | 31 | 35 | 5 | 5 | 5 | 5 | 5 | 5 |
| 7 | 7 | 3 | 3 | 17 | 17 | 9 | 9 | 9 | 9 | 9 | 9 | 15 | 19 | 23 | 27 | 31 | 35 |
|   | 11 | 7 | 7 | 3 | 3 | 11 | 15 | 19 | 23 | 27 | 31 | 25 | 29 | 33 | 37 | 41 | 45 |
|   |   | 11 | 11 | 7 | 7 | 3 | 3 | 13 | 13 | 13 | 13 | 9 | 9 | 9 | 9 | 9 | 9 |
|   |   | 15 | 11 | 11 |   | 17 | 21 | 15 | 19 | 23 | 27 | 11 | 15 | 19 | 23 | 27 | 31 |
|   |   |   | 15 | 15 |   | 7 | 7 | 3 | 3 | 17 | 17 | 29 | 33 | 37 | 41 | 45 | 49 |
|   |   |   |   |   | 19 | 13 | 17 | 25 | 29 | 19 | 23 | 3 | 3 | 13 | 13 | 13 | 13 |
|   |   |   |   |   |   |   | 11 | 7 | 7 | 3 | 3 | 17 | 21 | 15 | 19 | 23 | 27 |
|   |   |   |   |   |   |   | 13 | 21 | 25 | 33 | 37 | 23 | 27 | 41 | 45 | 49 | 53 |
|   |   |   |   |   |   |   |   | 11 | 11 | 7 | 7 | 7 | 7 | 3 | 3 | 17 | 17 |
|   |   |   |   |   |   |   |   | 17 | 21 | 29 | 33 | 13 | 17 | 25 | 29 | 19 | 23 |
|   |   |   |   |   |   |   |   |   | 15 | 11 | 11 | 27 | 31 | 31 | 35 | 53 | 57 |
|   |   |   |   |   |   |   |   |   | 17 | 25 | 29 |   | 11 | 7 | 7 | 3 | 3 |
|   |   |   |   |   |   |   |   |   |   | 15 | 15 |   | 13 | 21 | 25 | 33 | 37 |
|   |   |   |   |   |   |   |   |   |   | 21 | 25 |   | 35 | 35 | 39 | 39 | 43 |
|   |   |   |   |   |   |   |   |   |   | 19 |   |   |   | 11 | 11 | 7 | 7 |
|   |   |   |   |   |   |   |   |   |   | 21 |   |   |   | 17 | 21 | 29 | 33 |
|   |   |   |   |   |   |   |   |   |   |   |   |   |   | 39 | 43 | 43 | 47 |
|   |   |   |   |   |   |   |   |   |   |   |   |   |   |   | 15 | 11 | 11 |
|   |   |   |   |   |   |   |   |   |   |   |   |   |   |   | 17 | 25 | 29 |
|   |   |   |   |   |   |   |   |   |   |   |   |   |   |   | 47 | 47 | 51 |
|   |   |   |   |   |   |   |   |   |   |   |   |   |   |   |   | 15 | 15 |
|   |   |   |   |   |   |   |   |   |   |   |   |   |   |   |   | 21 | 25 |
|   |   |   |   |   |   |   |   |   |   |   |   |   |   |   |   | 51 | 55 |
|   |   |   |   |   |   |   |   |   |   |   |   |   |   |   |   |   | 19 |
|   |   |   |   |   |   |   |   |   |   |   |   |   |   |   |   |   | 21 |
|   |   |   |   |   |   |   |   |   |   |   |   |   |   |   |   |   | 59 |

FIG. 8

| NO. OF MODS | SINGLE LINE-UP SPREADING RACK | | DOUBLE LINE-UP SPREADING RACK | | | | TRIPLE LINE-UP SPREADING RACK | | | | | |
|---|---|---|---|---|---|---|---|---|---|---|---|---|
|  | A1 | B1 | A1 | B1 | C1 | D1 | A1 | B1 | C1 | D1 | E1 | F1 |
| 10 | 1,5,9 | 3,7 | 1,5,9 | 3,7 | 19,15,11 | 17,13 | 1,5,9 | 3,7 | 19,15,11 | 17,13 | 21,25,29 | 23,27 |
| 12 | 1,5,9 | 3,7 | 1,5,9 | 3,7,11 | 23,19,15 | 21,17,13 | 1,5,9 | 3,7,11 | 23,19,15 | 21,17,13 | 25,29,33 | 27,31,35 |
| 14 | 1,5,9,13 | 3,7,11 | 1,5,9,13 | 3,7,11 | 27,23,19,15 | 25,21,17 | 1,5,9,13 | 3,7,11 | 27,23,19,15 | 25,21,17 | 29,33,37,41 | 31,35,39 |
| 16 | 1,5,9,13 | 3,7,11,15 | 1,5,9,13 | 3,7,11,15 | 31,27,23,19 | 29,25,21,17 | 1,5,9,13 | 3,7,11,15 | 31,27,23,19 | 29,25,21,17 | 33,37,41,45 | 35,39,43,47 |
| 18 | 1,5,9,13,17 | 3,7,11,15 | 1,5,9,13,17 | 3,7,11,15 | 35,31,27,23,19 | 33,29,25,21 | 1,5,9,13,17 | 3,7,11,15 | 35,31,27,23,19 | 33,29,25,21 | 37,41,45,49,53 | 39,43,47,51 |
| 20 | 1,5,9,13,17 | 3,7,11,15,19 | 1,5,9,13,17 | 3,7,11,15,19 | 39,35,31,27,23 | 37,33,29,25,21 | 1,5,9,13,17 | 3,7,11,15,19 | 39,35,31,27,23 | 37,33,29,25,21 | 41,45,49,53,57 | 43,47,51,55,59 |

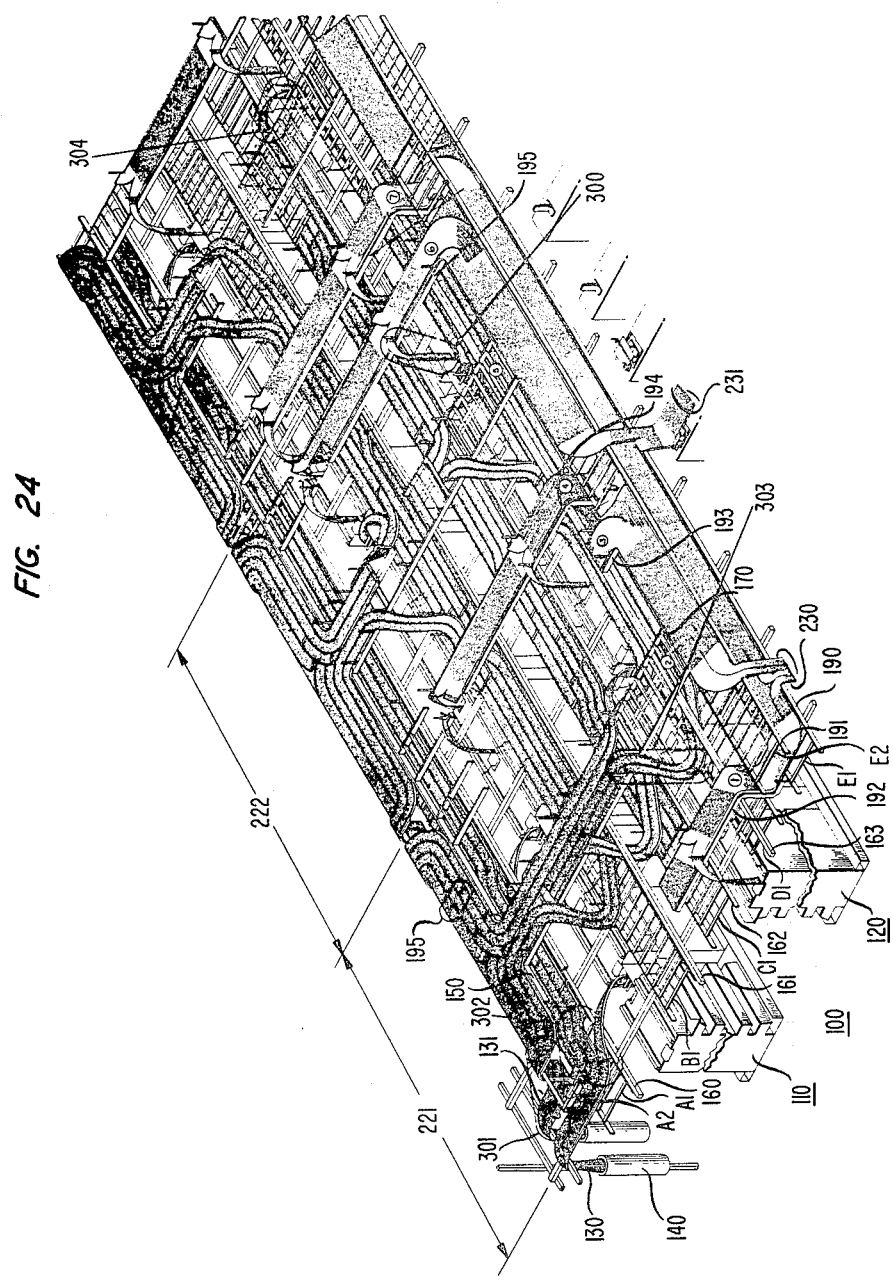

CABLE ROUTING METHODS AND APPARATUS

BACKGROUND OF THE INVENTION

1. Field of the Invention

This invention relates generally to modularized main distributing frames located in telephone central offices and, in particular, to methods and apparatus for linking such frames with outside plant cables and central office equipment leads.

2. Description of the Prior Art

The main distributing frame (MDF) in a telephone system serves as an interface between switching equipment housed in a central office and an outside plant cable network; this interface furnishes a nonswitched interconnection juncture for joining the office equipment to the outside plant facilities. The primary function of the MDF is that of providing a point of flexibility in the telephone system where any specified one of numerous subscribers may be connected to any specified one of the many terminating points associated with the switching equipment.

Recently, the MDF has undergone significant design changes. The modern MDF systems are modularized; such systems have decreased craftsperson activity and reduced frame administration time by supplanting earlier frame systems which typically required a two-person workteam and/or cumbersome frame administration procedures. For instance, in early frame systems, interconnection between the office equipment and customer equipment was often accomplished by running long jumpers between terminal points. Once jumpers of lengths greater than twenty feet or more were installed, it became difficult to remove them when wiring changes were necessitated. This difficulty caused jumper build-up and eventual clogging of the jumper troughs.

The modular systems have been designed primarily to alleviate jumper congestion. To achieve short jumper arrangements, the outside plant cables are uniformly distributed over many, diverse frame appearances. In modern MDF designs, this distribution is typically accomplished with so-called tip cables that couple the cables located in a cable entrance facility, typically the cable vault, with the MDF. In order to improve transmission performance on the facilities, the tip cables are shielded and have an increased cable diameter resulting in a many-fold increase in cable volume over more conventional MDF systems. The potential for severe cable congestion in the overhead racking in central offices due to pile-ups and cross-overs required a new approach to MDF cable routing in order to implement MDF systems that minimize jumper congestion.

SUMMARY OF THE INVENTION

The shortcomings, limitations and deficiencies of prior art main frame cabling methods are obviated in accordance with the present invention by an improved cable routing system and associated racking structure which minimize cable lengths and routes as well as cable buildups. Broadly speaking, the cabling method utilizes a two-level gridwork mounted above the frame system to route each cable to a preassigned location without overlapping other cables. Overlap is precluded by a partitioning arrangement that separates potentially overlapping cables into two groupings and then distributes the groupings or partitions on pairs of spreading racks that are horizontally displaced. In multiple frame line-ups, the groupings are delivered to individual frame rows via a rack oriented perpendicularly to the spreading racks.

The features, objects and advantages of the present invention will be apparent hereinafter from a detailed description of the invention and the appended claims taken in conjunction with the attached drawing of illustrative embodiments.

BRIEF DESCRIPTION OF THE DRAWING

FIG. 6 is a chart depicting the manner of partitioning cables into the two groupings yielding nonoverlapping cable distribution for single, double and triple line-ups and for various frame lengths expressed in modules;

FIG. 8 is a chart depicting the spreading racks to be utilized in routing tip cables to modules for single, double and triple line-ups and for various frame lengths expressed in modules;

FIG. 24 is an illustration, in top perspective view, of a double line-up main frame system wherein the tip and central office equipment cable racking arrangements are integrated to provide complete cable routing capabilities.

DETAILED DESCRIPTION

Figure 1:
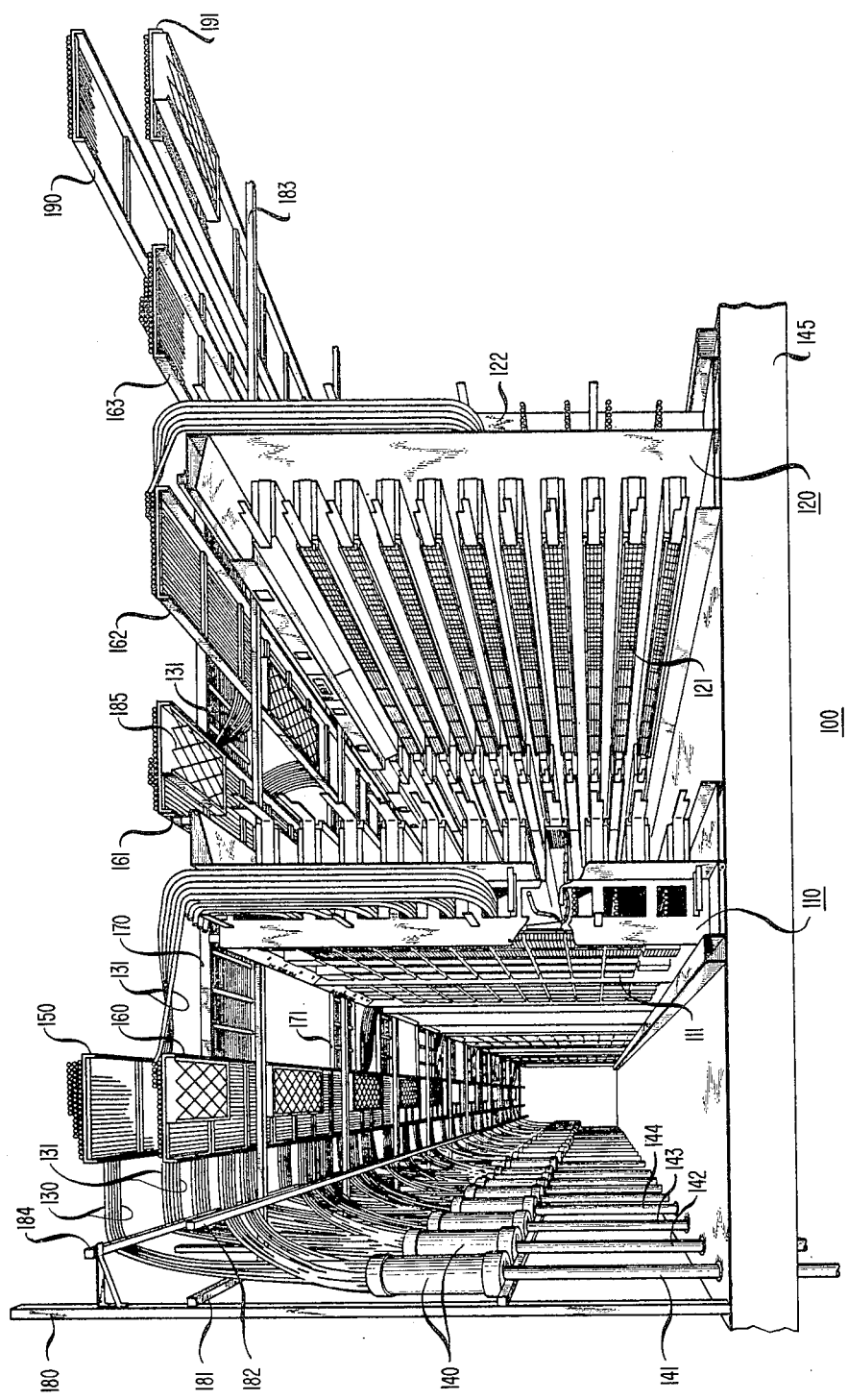
FIG. 1 is a side perspective view of a modular main frame system incorporating the tip cable racking technique provided in accordance with the present invention.

As an aid in understanding the detailed description, it is helpful to first focus on the cable routing system in an overview fashion and to consider specialized terminology utilized hereinafter. In this regard, FIG. 1 shows double line-up, modularized main frame system 100. In this design, protector fields and equipment fields are located in back-to-back fashion on a single, two-sided frame. In first frame line-up 110, protector side 111 is visible whereas in second frame line-up 120, equipment side 121 is shown. The tip cable pathway system, comprising distribution rack 150, spreading racks 160-163 and lateral racks 170,171, routes tip cables 130,131 from splice points 140 to the appropriate protector sides on frames 110 and 120. The racking arrangements minimize cable lengths and routes as well as cable pile-ups. Splice points 140 are supplied with outside plant cables 141-144 through central office floor 145. Horizontal supports 181-183 and vertical support 180 provide a suitable framework to affix racks 150, 160-163 and 170,171. Lighting is supplied by fixtures 185.

Figure 2:
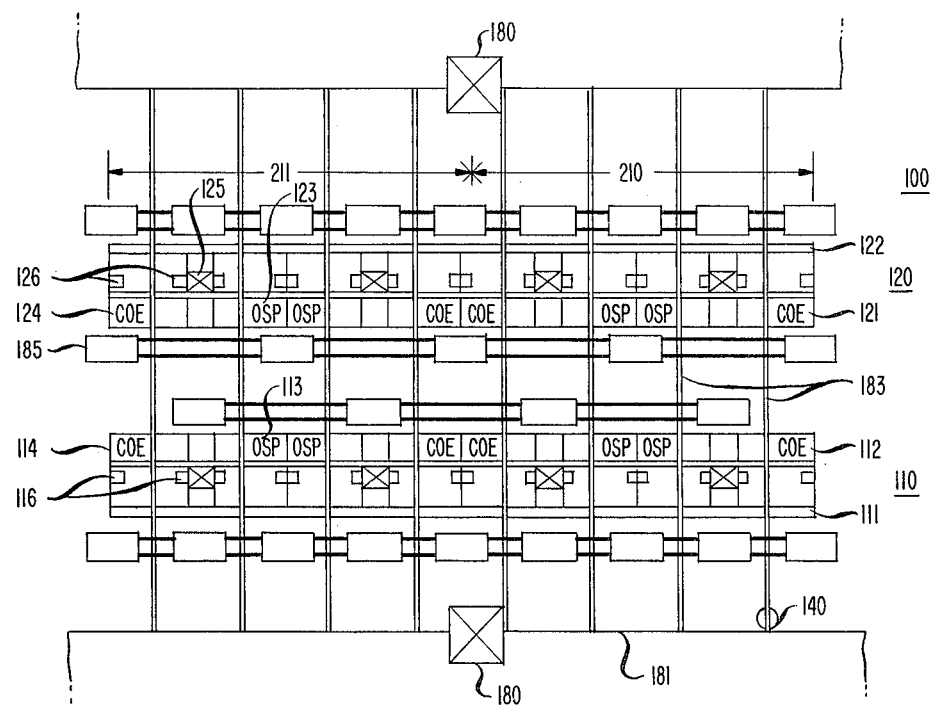
FIG. 2 is a top view of the frame system of FIG. 1 with the overhead racking removed.

FIG. 2 shows a top view of frame 100 with all overhead racking arrangements removed. Protector side 122 of line-up or row 120 is now depicted. Electrical protectors (not visible) on sides 111 and 122 form part of the series electrical path from tip cables 130,131 (see FIG. 1) to outside plant terminal appearances 113,123 on equipment side 112,121, respectively. Backplane cabling (not shown) interconnects the protector side with the outside plant (OSP) terminals on the equipment side to complete the series path. Tip cables are routed to protector sides 111,122 via vertically aligned chutes 125.

Central office equipment leads are routed to equipment sides 112,121 via vertically oriented chutes 116,126 and terminate on central office equipment (COE) tie points 114,124, respectively. The electrical connection between, say, terminals appearing at 123 and 124 is accomplished via jumpers placed by central office personnel along troughs in equipment side 121.

A frame zone, depicted as 210 or 211 in FIG. 2, comprises typically 10,000 line appearances and spans equal numbers of equipment appearances 124 and outside plant appearances 123.

Figure 3:
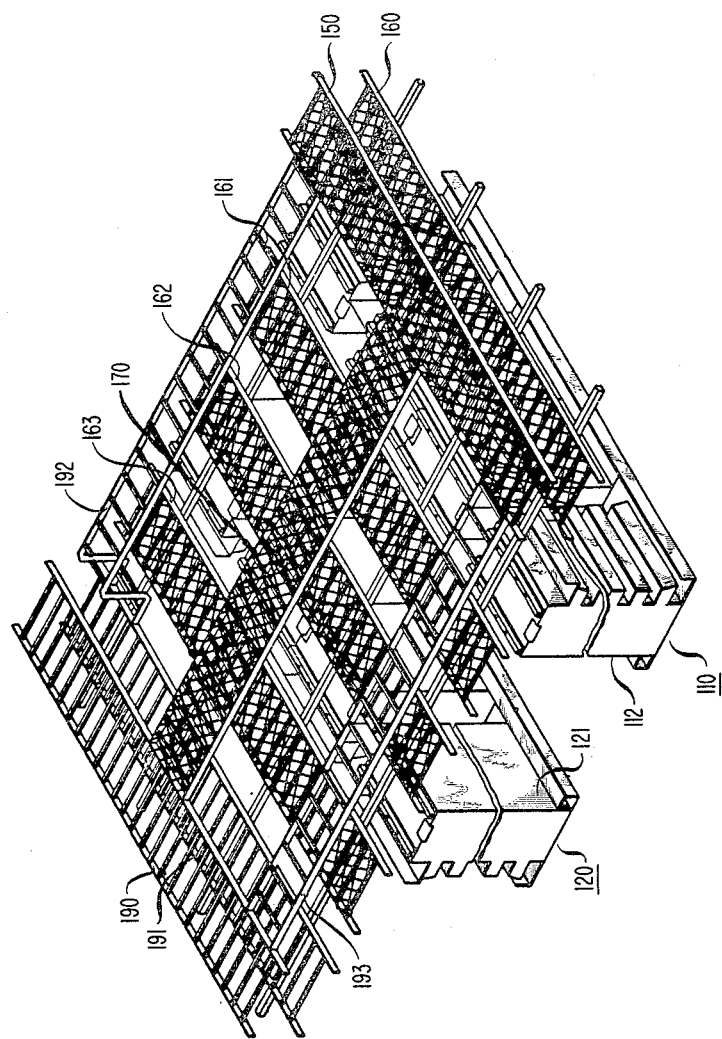
FIG. 3 is a top, perspective view of the frame system of FIG. 1 particularly depicting the tip and equipment cable racking of the present invention.

FIG. 3 depicts in top, perspective view all the overhead racks capable of delivering cabling to two frame modules per line-up in a double line-up. In addition to the tip cable racking elements 150, 160-164 and 170, central office equipment in-line racks 190,191 and primary and secondary lateral racks 192 and 193 are also shown. The orientation and function of all these racks will be discussed in more detail shortly.

Prior to actual installation of the tip cabling, a routing plan must be developed; the plan provides for cable rack identification as well as the order in which cables are to be run. Minimal cable pile-up is achieved by evenly spacing splice points 140 (see FIG. 1) parallel to the frame rows. This distribution is accomplished by dividing the total number of outside plant pairs to be terminated on frame system 100 by the number of OSP terminal groupings in the longest line-up. The tip cables are placed in regions equal to a framework zone.

Once the location of splices 140 is established, a cable directory can be completed. The cables are partitioned into two groupings. In the first grouping, a preselected number of pairs, typically 500, are assigned to the first framework zone and different sets of pairs are assigned to every other zone in a line-up; the second grouping fills the remaining framework zones in that line-up. By dedicating separate spreading racks for each grouping associated with a framework line-up (e.g., in FIG. 1, racks 160 and 161 associated with line-up 110) the natural cable crosses are eliminated and cable pile-up is minimized. This result is shown pictorially by comparing FIGS. 4 and 5. From FIG. 4, a single grouping of the five cables results in cable crosses; however, dividing the cables into two groups eliminates crosses, as depicted in FIG. 5.

Figure 4:
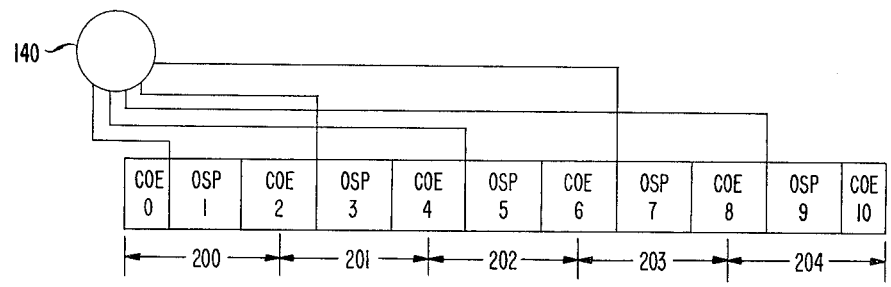
FIG. 4 is a pictorial diagram of framework zones, including module allocations, depicting cable cross-overs for a single rack implementation.
Figure 5:
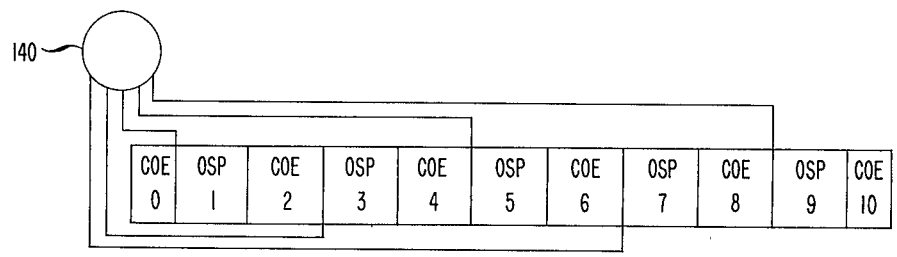
FIG. 5 is a pictorial diagram of framework zones depicting elimination of cable cross-overs for a double rack allocation scheme.

In FIG. 4, five framework zones 200-204 are depicted. Oftentimes, rather than couching the discussion in terms of zones, it is convenient to use a nomenclature couched in terms of modules. Accordingly, the leftmost half module in zone 200, which is allocated to equipment terminations, is designated module 0. The next full module, module 1, is a field of frame appearances terminating protector leads. The equipment module that spans zones 200 and 201 is designated module 3. The sequencing and numbering continues in this manner. With this nomenclature, the table in FIG. 6 presents the two groupings of cables for single, double and triple line-ups and for line-up lengths ranging from 10 to 20 modules. In any given column in FIG. 6, the leftmost arrangement of modules represents the cables assigned to the first grouping and the rightmost arrangement of modules comprises the second grouping. The groupings depicted in FIG. 5 correspond to the column labelled "10" under the heading "SINGLE".

Once the groupings have been determined via the appropriate column in FIG. 6, a cable directory is generated. The directory summarizes the allocation of the pairs appearing in cables 141,142, . . . (see FIG. 1) to insure diverse appearances of the pairs on frame system 100 so as to minimize jumper lengths. A portion of a typical cable location directory based on a single line-up, ten module system is given in Table 1.

TABLE 1

| CABLE NUMBER | PAIRS | MODULE | SHELF |
|---|---|---|---|
| 141 | 1-500 | 1 | 6 |
| | 501-1000 | 5 | 6 |
| | 1001-1200 | 9 | 6 |
| 142 | 1-300 | 9 | 6 |
| | 301-800 | 3 | 6 |
| | 801-1300 | 7 | 6 |
| | 1301-1700 | 1 | 6 |
| 143 | 1-100 | 1 | 6 |
| | 101-600 | 5 | 6 |
| | 601-1100 | 9 | 6 |
| | 1101-1200 | 3 | 6 |
| 144 | 1-400 | 3 | 6 |
| | 401-900 | 7 | 6 |
| | 901-1200 | 1 | 5 |

In each module, there are typically 10 shelves and each shelf has terminal blocks adapted to accept typically 1000 pairs. From Table 1, it is seen that the 1000 pairs terminating in shelf 6 of module 1 arise from pairs 1-500 of cable 141, pairs 1301-1700 of cable 142 and pairs 1-100 of cable 143. Once shelf 6 is filled, the pairs are assigned to shelf 5, then shelf 7, and so forth until all shelves and modules are filled.

Although the spreading of Table 1 demonstrates one technique for allocating pairs, it is apparent that other techniques may also be developed with the proviso that sufficient spreading is to be maintained to avoid long jumpers.

With reference again to FIG. 3, the racking structure and cable routing technique are now discussed in more detail. Spreading racks 160-164 carry tip cables (130,131 of FIG. 1) from the framework zone to lateral rack 170. These racks 160-164 run parallel to the frame line-ups at a level immediately above the top of the frames. There are two spreading racks per frame line-up and one is dedicated to carrying the first pair grouping and the other the second pair grouping. Spreading racks may be identified by alphanumerics as a shorthand notation. First spreading rack 160 is designated as having horizontal orientation A, second rack 161 has orientation B in the horizontal plane, and so forth. A number following the letter identifier indicates the height at which a rack lies above the in-line frames—1 represents the lowest plane, 2 indicates a plane above level 1, and so on. Thus, rack A1 translates to the first spreading rack at the first level or rack 160.

Tip lateral rack 170 is used only when spreading overhead to more than one framework line-up. The lateral racks carry tip cables from spreading racks 160-164 to tip distribution rack 150. The lateral racks run perpendicular to the frame line-ups at the uppermost level, generally level 2. The number of tip lateral racks is equal to the number of OSP modules in the longest line-up. Two lateral racks per central office equipment module (racks 192 and 193 in FIG. 3) are used for routing office equipment leads. Lateral racks are numbered consecutively. Every third lateral starting with number 2 is a tip cable lateral in a multiple line-up system; otherwise, equipment laterals are numbered consecutively.

Tip distribution rack 150 distributes cables from the lateral racks to splice positions (140 of FIG. 1) located along a wall of the central office. Rack 150 is placed at the second level immediately over the first spreading rack and thus is represented by A2. In addition, splice positions are numbered sequentially.

In single line-up installations, the two spreading racks are located on the same side of the frame line-up, one above the other, and there is no need for a tip cable distribution rack or tip lateral racks. In multiple line-up systems, each pair of spreading racks straddle a frame line-up. Also, tip cables associated with the first cable grouping for the line-up closest to the splice positions do not use either a tip lateral or the distribution rack. Level A1 carries tip cables directly from the OSP modules to the splice positions.

The routing logic of any tip cable is dependent on the module location as determined from the cable location directory (Table 1) and, in the case of multiple line-ups, the fill on tip laterals. The cable limit on a tip lateral capable of carrying about 2000 pairs per layer is determined by dividing the total OSP pairs by the number of tip cable laterals in the longest line-up and rounding to the nearest 500 (tip cables are generally spread in 500 pair groups). A maximum of typically 10,000 pairs is distributed to each line-up from a tip lateral with the exception noted above, that is, rack A1 spreads OSP cables directly from the first grouping to the first line-up.

Figure 7:
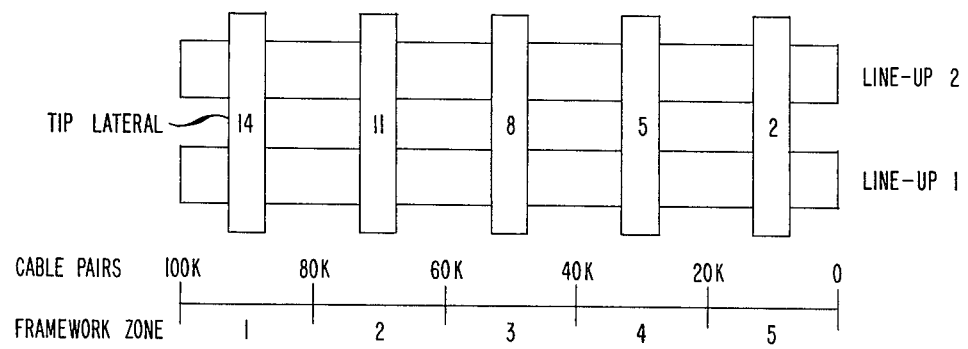
FIG. 7 is a pictorial diagram of the layout of a double line-up, ten module frame system indicating the location of the cable pairs relative to the framework zones.

As an example of the routing procedure, a central office containing two line-ups of ten modules each is considered, as depicted in FIG. 7. A cable location directory similar to Table 1 is generated; it is presumed the directory indicates that pairs 55,001 to 55,500 go to module 13, shelf 3 from splice position 15. From FIG. 6, module 13 is associated with the second grouping of tip cables. Also, pairs 55,001 to 55,500 fall within pair count 40,000 to 60,000 as shown in FIG. 7, so the tip lateral with designator 8 is used. One final piece of information—the spreading rack to be used—is provided by FIG. 8. The tip cable is routed to module 13 via rack D1 as seen under the row labelled "10" and the column labelled "DOUBLE LINE-UP". The full routing information may be summarized as:
FROM: Splice position 15
TO: Module 13, Shelf 3
ROUTE: A2, 8, D1

Now that cable routing information is available, the methodology of routing must be addressed. To this end, all cables associated with rack A1 are placed before proceeding to rack B1, C1, D1 and so forth. Running cables on rack A1 first ensures clear access to cable groups for the work activities of clipping and securing. Typically, cable groups routed to the left or right along distribution rack A2 are collated into four sets of five cables each. These twenty cables form one layer on a standard rack. The groups of five cables should be banded with cable clip 195 (see FIG. 10) that allows the five cables to be shifted or stacked in board-like fashion. One example of such a clip is disclosed in U.S. patent application Ser. No. 106,004, filed Dec. 21, 1979 by J. P. Starace; that application is incorporated by reference as though it was reproduced by its entirety herein.

Figure 9:
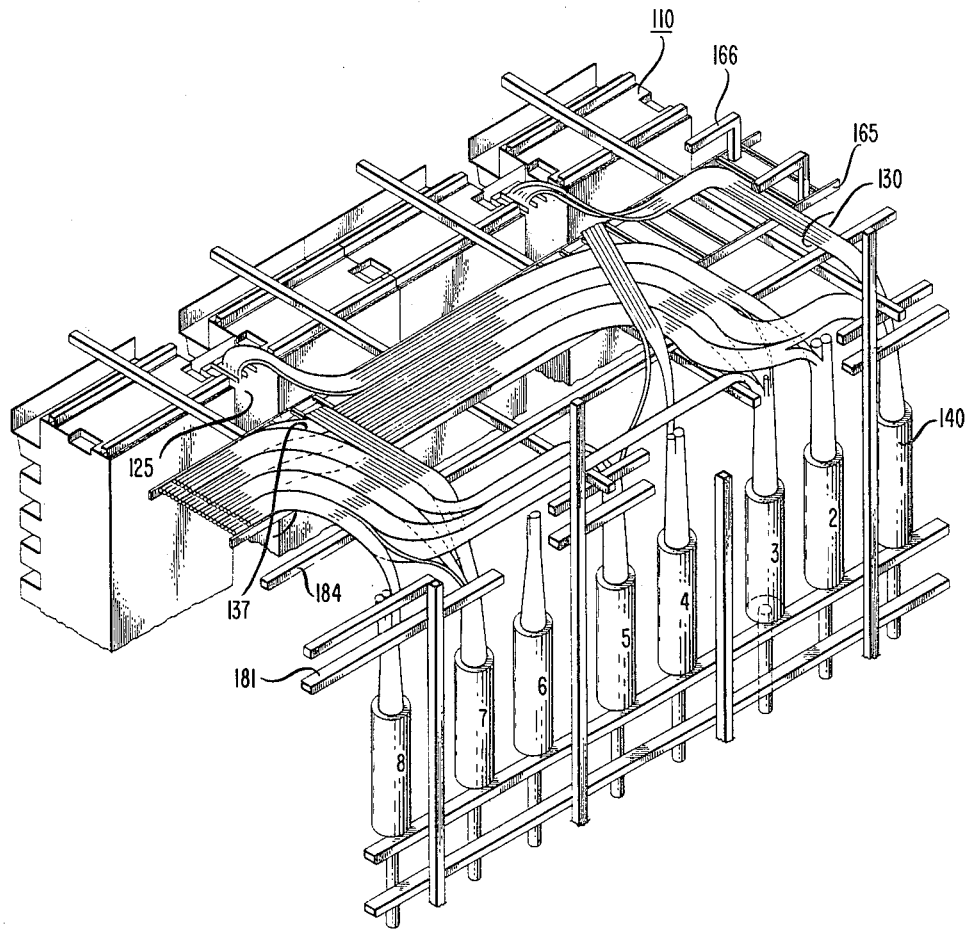
FIG. 9 depicts the cable transition in going from the splice points to the spreading racks for a single line-up.

The transition from the splice points (140 in FIG. 1) to distribution rack (150 in FIG. 1) in multiple line-ups or to spreading racks (165,166 in FIG. 9) in a single frame line-up absorbs any cable crosses. The primary objective of the cable routing technique is that of eliminating cable crosses in the lateral and spreading racks. However, the spreading requirement of distributing cables over several OSP modules from one splice point makes it virtually impossible not to cross cables. Cable crosses that do occur are relegated to the transition at splice points. FIG. 9 illustrates a typical cable transition from first spreading rack 165 to splice points 1-8 for a single frame line-up. The cable groups (e.g., layer 137) exit from rack 160 near the first splice point associated with any one of the four cable groups in a layer. The groups are routed over guide bar 184 and dropped at the appropriate splice point. In a multiple line-up system, cables on the distribution rack are dropped directly to the associated splice points.

Figure 10:
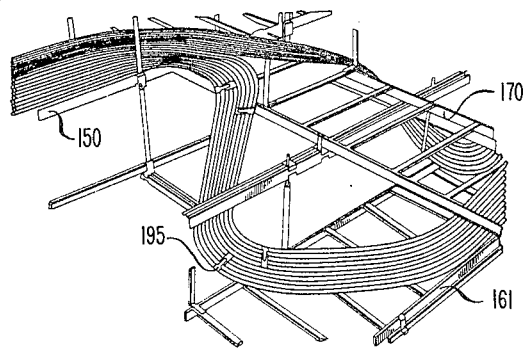
FIGS. 10 through 12 demonstrate the three basic transitions in going from a lateral rack to a spreading rack.
Figure 11:
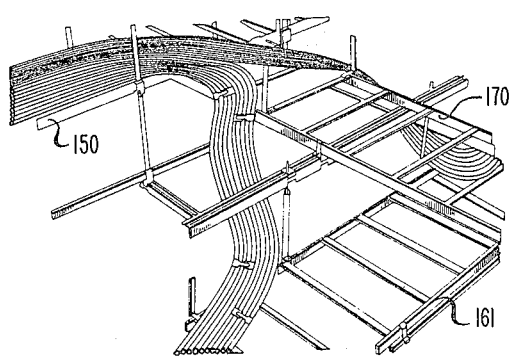
Figure 12:
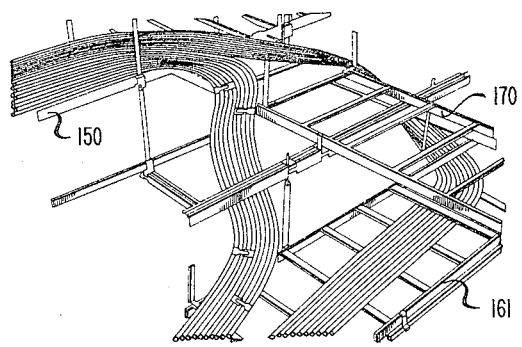
Figure 13:
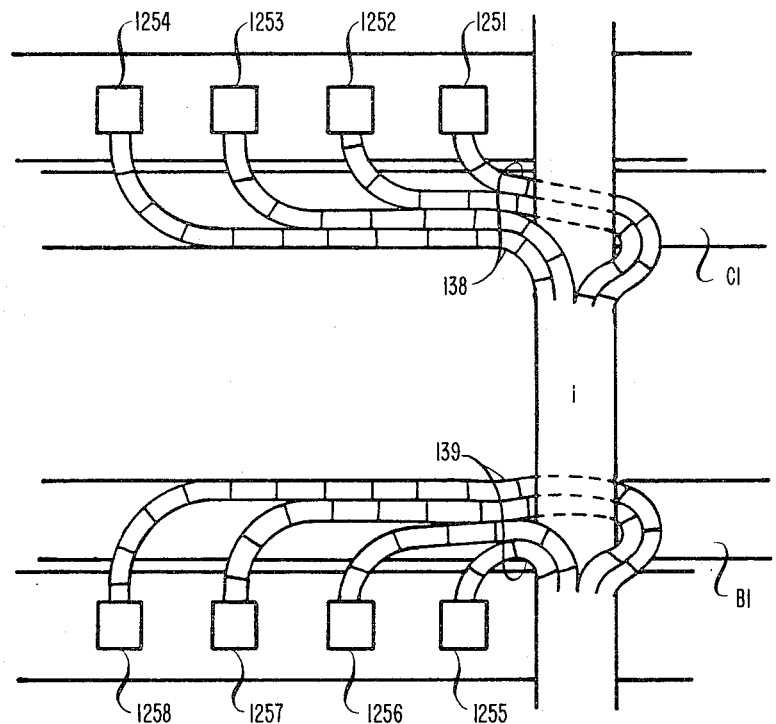
FIG. 13 shows the partitioning of cables into layers and the transition of these layers as exemplified by the basic transition of FIG. 10.

The so-called "gull wing" cable arrangements depicted in FIGS. 10-12 are utilized in the transition from a lateral to a spreading rack. This transition is effective in providing a smooth, nonblocking drop to a spreading rack. Three basic transitions are illustrated by FIGS. 10-12 with FIG. 10 showing a full left feed arrangement, FIG. 11 a feed left-feed right transition, and FIG. 12 a full right feed arrangement. Any or all of these arrangements may be used depending on the job condition. As an example, FIG. 13 depicts a situation wherein four cable chutes 1251-1254 are being served by spreading rack C1 to the left of lateral i. The first and second groups in layer 138, which serve chutes 1254 and 1253, respectively, form transitions directly left to rack C1. The third and fourth groups on lateral i pass under the lateral, as per FIG. 10, to reach chutes 1252 and 1251, respectively.

Figure 14:
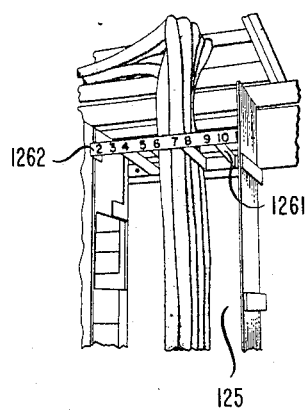
FIGS. 14 through 18 illustrate the basic transitions utilized in routing cables between the cable chutes and a front spreading rack.
Figure 15:
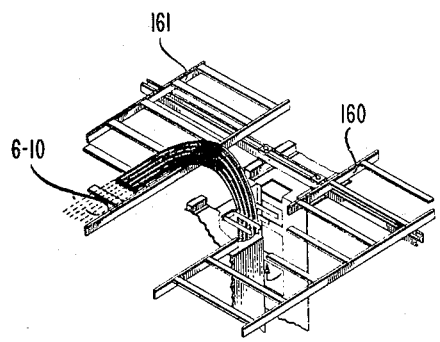
Figure 16:
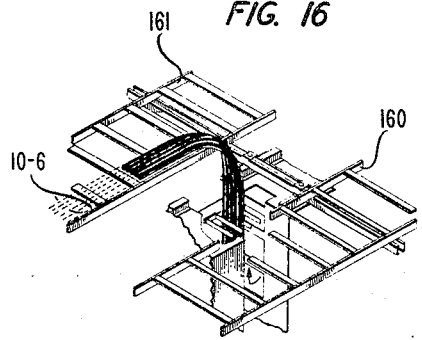
Figure 17:
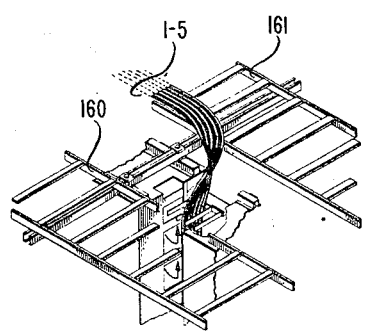
Figure 18:
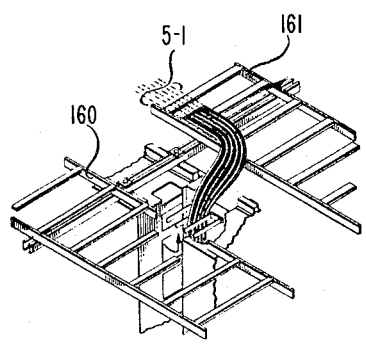
Figure 19:
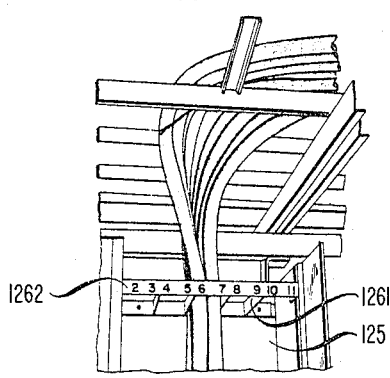
FIGS. 19 through 23 illustrate the basic transitions utilized in routing cables between the cable chutes and a rear spreading rack.

FIGS. 14-18 illustrate the basic transitions from cable chute 125 to front spreading rack 161. In FIG. 14, dividers 1261 separate incoming cables into 5 groups of ten cables each. Each group of ten cables is further subdivided into two groups of 5 cables. Each five-cable layer feeds a separate shelf; the shelves are labelled 2 through 11 on guide 1262. As depicted, only shelves 6 and 7 have cables routed to them. In each shelf, there are ten blocks, with each block capable of terminating 100 pairs. In each of FIGS. 15-18, a five-cable partition associated with the 5 contiguous blocks which will terminate cables is depicted. For example, the left feed of FIG. 15 shows how the cable grouping homing on blocks 6 through 10 bends at the transition point in order to serve one shelf in the range 7 through 11. FIG. 16 depicts the cable bending arrangement to serve blocks 10 down to 6 on shelves 6 to 2. FIGS. 17 and 18 show how blocks 1–5 may be accessed for shelves 6 to 2 and 7 to 11, respectively.

Figure 20:
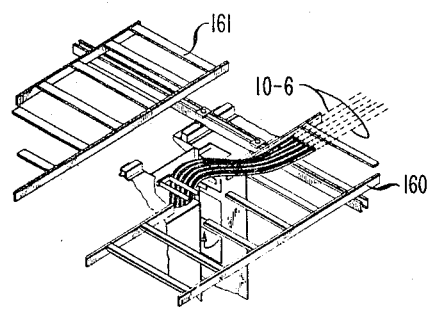
Figure 21:
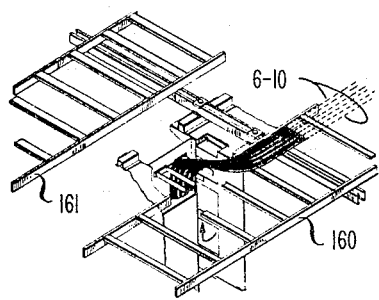
Figure 22:
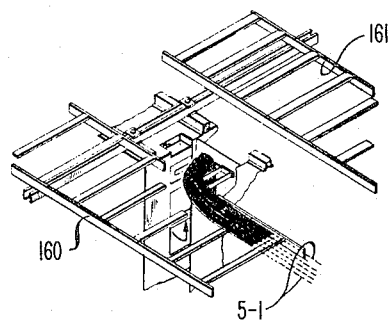
Figure 23:
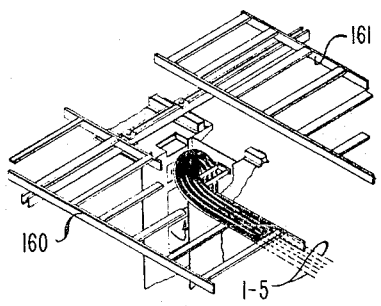

In a manner similar to FIGS. 14–18, FIGS. 19–23 illustrate the basic transitions from cable chute 125 to rear spreading rack 160. In FIG. 19, dividers 1261 again separate incoming cables into 5 groups of ten cables. Each ten cable group is further partitioned into two equal layers. FIG. 20 shows the transition to be utilized in feeding blocks 10 down to 6 on one shelf in the range 7 through 11. FIG. 21 demonstrates the bending arrangement to feed shelves 6 to 2, blocks 6 through 10. FIGS. 22 and 23 show how blocks 1 through 5 may be accessed for shelves 6 to 2 and 7 to 11, respectively.

In the foregoing discussion, only the racking arrangements and accompanying routing methodologies associated with tip or OSP cables have been described. An operational MDF requires that racking arrangements and accompanying methodologies associated with COE leads be fully integrated with tip cable racking configurations. FIG. 24 depicts, in top perspective view, double line-up frame system 100 interconnected with tip cables 130,131 and equipment cables 230,231. The racking structure associated with the COE leads, generally grouped as cables, comprises: first and second in-line racks 190 and 191, respectively, which run parallel to frame rows 110 and 120; primary and secondary cross racks 192 and 193, respectively, associated with first framework zone 221; primary and secondary cross racks 194 and 195, respectively, associated with second zone 222; and so forth. First in-line rack 190 is placed at the first level and to the rear of line-up 120; in terms of previous nomenclature, rack 190 has location E1. Similarly, rack 191 has location E2. Cross racks 192–195, in terminology employed for laterally oriented racks, have locations 1,3,4 and 6, respectively. The ends of primary racks 192 and 194 are L-shaped to allow for the transition of COE cables between in-line rack 190 and the primary rack. Primary rack 192 and secondary rack 193 traverse tip spreading racks 160–164 at the second level and are centered over each COE half-module in framework zone 221. Similarly, primary and secondary racks 194 and 195 bridge racks 160–164 and are centered over the COE modules in zone 222. Generally, primary racks (e.g., 192,194) distribute COE leads routed along the lower in-line rack (e.g., 190) and the secondary racks (e.g., 193,195) distribute leads located on the upper in-line rack (e.g., 191). The cable routing paths are determined in a manner similar to the tip cable spreading technique, that is, a cable directory is generated consistent with the objective of having COE appearances at diverse locations. Transitions from cross racks 192–195 to COE frame terminals are of the gull-wing type described earlier for tip cables; cable group 300 emanating from rack 195 depicts such a transition.

FIG. 24 also depicts, by way of reiteration, the transitions: (i) from splice points 140 to distribution rack 150, shown as transition 301; (ii) from first spreading rack 160 to an OSP module in framework zone 222, labelled 302; (iii) from lateral 170 to spreading rack 163, shown as gull-wing transition 303; and (iv) from spreading rack 163 to cable chute, labelled 304.

Whereas the foregoing discussed cabling arrangements for an overhead racking structure, it is evident that similar arrangements may be devised for a so-called bottom feed frame system. A bottom-feed system is employed in those instances wherein building constraints or cable distribution problems preclude the introduction of splice points 140 (see FIG. 1) along a central office wall. Except for inverted racking levels, the implementation is substantially the same as the overhead structure.

It will be further understood that the main frame cabling arrangements and methods herein described is not limited to specific embodiments disclosed by way of illustration, but may assume other embodiments limited only by the scope of the appended claims.

We claim:

1. A method for connecting a distributing frame system (100) with incoming cables (130, 131 or 230,231), said system comprising at least one row of contiguous frame modules having alternating appearances of outside plant terminals (113) and central office equipment leads (114) connected by jumpers on the equipment side (112) of said modules and a racking arrangement having in-line (150, 160–163, or 190,191) and lateral (170, 171 or 192–195) members wherein a plurality of said members with one orientation and said members having the other orientation are utilized in seriatim to route said cables to said modules, said method
  characterized by the steps of assigning each of said cables to a particular one of said modules according to a predetermined pattern to minimize the lengths of said jumpers,
  partitioning said cables into groupings in correspondence to the number of said members in said plurality according to a preselected pattern to minimize cable cross-overs during routing,
  vertically displacing a first plane containing said members with said one orientation from a second plane containing said members with said other orientation, and
  distributing said cables in accordance with assigned and partitioned location by routing the individual cables in said groupings along said members in said second plane to corresponding members in said first plane.

2. A method for interconnecting frame appearances on a modular distributing frame system (100) with incoming cables (130,131), said system comprising a plurality of parallel rows (110,120) of contiguous frame modules, said method
  characterized by the steps of
  providing a distribution rack (150), a plurality of first and second spreading racks (160–164), one pair for each of said modules and said rows, and at least one lateral rack (170,171), one for each of said modules in a single one of said rows,
  locating all of said first and second spreading racks on a first level immediately above said frame system, said at least one lateral rack and said distribution rack on a second level, with said distribution rack and all of said spreading racks arranged in parallel to said rows and said at least one lateral rack arranged in perpendicular to said rows,
  assigning each of said cables to a particular one of said modules,
  partitioning said cables into first and second groupings, and
  routing said cables in accordance with assigned and partitioned location along said distribution rack to the appropriate one of said modules and its associated lateral rack, to the appropriate one of said rows and its associated spreading racks, and to said frame appearances by running said first and second groupings along said first and second spreading racks, respectively.

3. A method for interconnecting frame appearances on a modular distributing frame system (100) with incoming cables (130,131), said system comprising a single row (110) of contiguous frame modules, each of said modules having an equipment side (112) and a protector side (111), said method
characterized by the steps of
providing first and second spreading racks (165,166) and an in-line spreading bar (184),
locating one of said racks and said bar on a first level immediately above said frame system, on said protector side, and in parallel with said row, and the other of said racks on a second level above said one of said racks and in parallel with said row,
assigning each of said cables to a particular one of said modules,
partitioning said cables into first and second groupings, and
routing said cables in accordance with assigned and partitioned location over said bar to the appropriate one of said modules by summing said groupings along said first and second spreading racks, respectively.

4. A method for interconnecting outside plant appearances (123) and equipment terminals (124) arranged on a modular distributing frame system (100) with incoming outside plant cables (130,131) and equipment leads (230,231), said system comprising a plurality of parallel rows of contiguous framework zones (221,222), each of said rows having outside plant modules and equipment modules occupying alternate positions, said method
characterized by the steps of
providing a distribution rack (150), a plurality of first and second spreading racks (160-163), one pair for each of said modules and said rows, and at least one lateral rack (170), one for each of said framework zones,
providing first and second in-line racks (190,191), a plurality of primary and secondary cross racks (192-195), one pair for each of said framework zones,
locating all of said first and second spreading racks and said first in-line rack on a first level immediately above said frame system, said at least one lateral rack, said primary and secondary cross racks, said distribution rack and said second in-line rack on a second level above said first level,
orienting said spreading racks, said first and second in-line racks and said distribution rack in parallel to said rows and said at least one lateral rack and said cross racks in perpendicular to said rows,
arranging each pair of said first and second spreading racks to straddle one of said rows and, in each of said zones, said primary and secondary cross racks to straddle the associated one of said at least one lateral rack,
positioning said distribution rack above the first spreading rack associated with the first of said rows and positioning said in-line racks, one above the other, adjacent to the second spreading rack associated with the last of said rows,
assigning each of said outside plant cables to a particular one of said outside plant modules and each of said equipment leads to a particular one of said equipment modules,
partitioning said cables into first and second groupings and said leads into primary and secondary groupings,
routing said cables in accordance with assigned and partitioned location along said distribution rack to the appropriate one of said outside plant modules and its associated lateral rack, to the appropriate one of said rows and its associated spreading racks, and to said outside plant appearances by running said first and second groupings along the appropriate one of said first and second spreading racks, respectively, and
routing said leads in accordance with assigned and partitioned location along the appropriate ones of said first and second in-line racks and said cross racks as determined by the primary and secondary groupings, respectively.

5. A distributing frame system including at least one row of contiguous frame modules (221,222), a plurality of incoming cables (130,131 or 230,231) and a racking arrangement above said modules for routing said cables, said system
characterized by
a distribution rack (150) at the top of said racking arrangement, arranged parallel to said row and above said incoming cables, for receiving said cables,
a lateral rack (170,171) arranged on the same level as said distribution rack and perpendicular to said row for receiving cables from said distribution rack for routing to said row, and
a plurality of vertically displaced spreading racks (160-164) below said lateral rack and above and parallel to said row for receiving paritions of said cables and routing said partitions to selected ones of said frame modules on either side of said lateral rack without cable overlapping.

* * * * *